Aug. 20, 1968     C. W. SAUSSELE     3,397,587

AXIAL PROPORTIONAL LOADING DEVICE WITH OVERLOAD PROTECTION

Filed Oct. 4, 1965

INVENTOR.
CHARLES W. SAUSSELE
BY Walter Patoroka, Jr.
John P. Moran
ATTORNEYS

United States Patent Office 3,397,587
Patented Aug. 20, 1968

3,397,587
AXIAL PROPORTIONAL LOADING DEVICE
WITH OVERLOAD PROTECTION
Charles W. Saussele, Southfield, Mich., assignor to Holley Carburetor Company, Warren, Mich., a corporation of Michigan
Filed Oct. 4, 1965, Ser. No. 492,765
4 Claims. (Cl. 74—200)

ABSTRACT OF THE DISCLOSURE

This application discloses a variable speed transmission of the type comprising an input shaft having an input disk connected thereto, an output disk, a plurality of traction drive balls confined between the input and the output disks, a separate output shaft not connected directly to the output disk and journalled in a stationary support, the output disk having a circular series of alternate, connected oppositely-inclined surfaces formed on the side thereof opposite the traction balls, a flat-faced disk disposed adjacent the side of the output disk having the inclined surfaces, a plurality of rolling traction elements confined between the output disk and the flat-faced disk, a thrust bearing and a preload spring disposed between the support and the adjacent side of the flat-faced disk, the spring providing the only axial load on the elements of the transmission from the flat-faced disk to the input disk, the inclined surfaces and their associated rolling traction elements automatically increasing the load as torque transmitted to the output disk increases, and vice versa, the flat-faced disk and the output shaft being drivingly connected by axially resilient means permitting limited axial movement of the flat-faced disk so that the rolling traction elements may move along said inclined surfaces, without applying an appreciable load on the output shaft, thereby permitting the output disk to rotate with respect to the flat-faced disk to provide output overload protection.

---

This invention relates to variable speed transmissions of the ball and disk type, and more particularly to means for providing loading on the traction balls in proportion to the torque being developed and overload protection.

While several prior art transmissions provide means for loading in proportion to the torque being developed (see Rouverol 2,951,384 for example), such prior art devices have certain inherent disadvantages. For example, most of these devices do not include satisfactory means for providing overload protection, resulting in potential failure under certain conditions.

Accordingly, the main object of this invention is to overcome the disadvantages of the prior art ball and disk type transmissions.

Another object is to provide novel co-operating clutch and spring washer means for providing both proportional loading and overload protection in a ball and disk type transmission.

Still another object of the invention is to provide such means including a plurality of inclined surfaces, a plurality of rolling members located at the bases of said inclined surfaces and resilient means for opposing movement of the rolling members up the inclined surfaces, the force exerted by the resilient means increasing as the rolling members move up the incline.

Another object of the invention is to provide such means, including an output disk, a coaxial output shaft, resilient means providing an axial load on said disk through said shaft and means including a plurality of alternating reverse sloped surfaces and roller members co-operating therewith for at times increasing the force of the resilient means up to a predetermined limit and thereafter decreasing the force thereof.

Another object of the invention is to provide a novel output disk and shaft mounting means particularly adapted to permit provision of proportional loading and overload protection.

Other objects and advantages of the invention will become more apparent when reference is made to the following specification and the accompanying drawings wherein.

Figure 1:
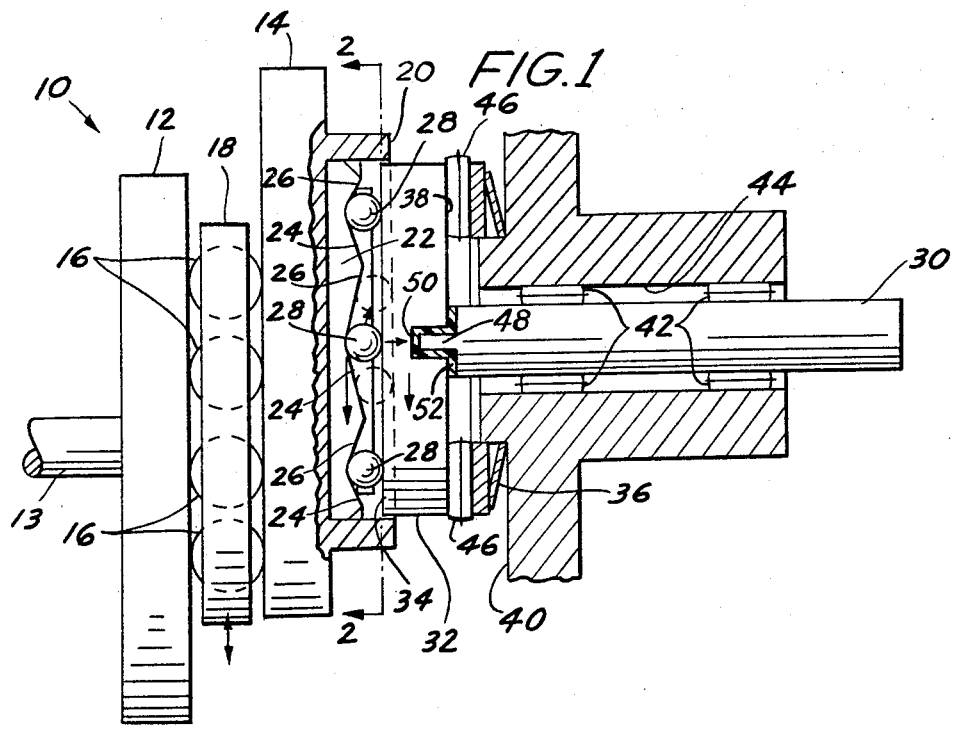
FIGURE 1 is a side elevational view, with portions thereof cut away and in cross section, of a typical ball and disk type transmission embodying the invention.

It should be stated at the outset that the transmission shown is generally constructed of circular elements so that the two figures are sufficient to illustrate the structure involved.

Referring now to the drawings in greater detail, a ball and disk type transmission 10 to which the invention can be applied includes an input disk 12 mounted on a shaft 13 driven by some suitable means, such as an electrical motor (not shown), and an offset output disk 14. A plurality of traction balls 16 are confined in a shiftable circular cage 18. A cylindrical wall or extension 20 is formed on the side of the output disk 14 opposite the traction balls 16, and a member 22 having a circular track of alternately inclining and declining surfaces or ramps 24 and 26, respectively, is formed on or fixedly secured to the output disk 14 within the cylindrical extension 20, which is the only part of the output disk 14 assembly that is broken away in FIGURE 1. A drive member 28, which may be a ball or roller, is located at the base of each set of ramps and confined radially between the wall 20 and a ring 29 (FIGURE 2). In lieu of this arrangement, a cage somewhat similar to the cage 18 could be employed in conjunction with the balls 28.

To implement the invention, the usual output shaft 30, includes a drive disk or collar 32 having a flat face 34 formed on the inner end thereof. The collar 32 fits within the cylindrical extension 20 and is held against the drive members 28 by resilient means, such as a Belleville spring washer 36 mounted between the face 38 of a collar 32, opposite the face 34, and a fixed abutment or housing 40. A plurality of support bearings 42 are mounted between the wall of passage 44 formed in the stationary housing 40 and the output shaft 30, and a thrust bearing 46 is, of course, mounted between the face 38 and the stationary Belleville spring washer 36.

Operation

Figure 2:
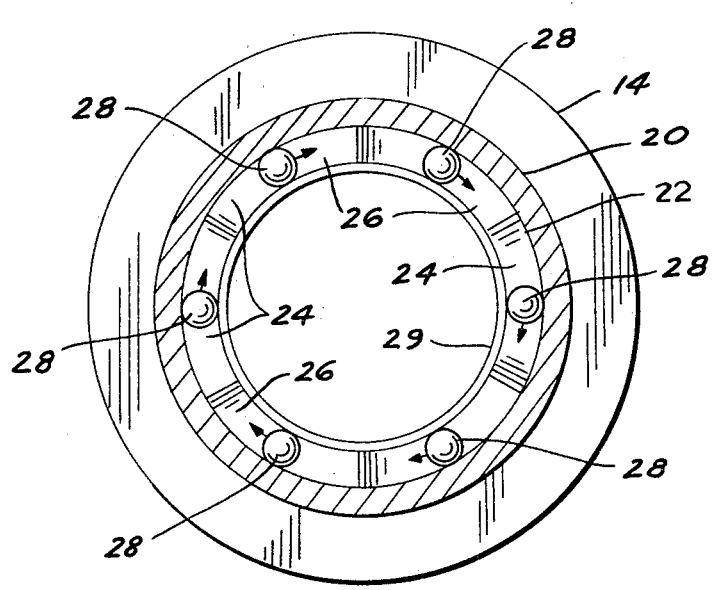
FIGURE 2 is a cross-sectional view, taken along the plane of the line 2—2 of FIGURE 1, as if FIGURE 1 were not cut away, and looking in the direction of the arrows.

As schematically illustrated in FIGURE 1 and as explained in various prior art patents, for example, Rouverol 2,951,384, the input and output disks 12 and 14 are mounted parallel to one another and with their axes offset from one another, in order to accomplish a resultant variable output speed. The input disk 12 is, of course, driven by any suitable means, such as an electric motor (not shown). As is well known in the art, the speed of the driven disk 14 depends upon the location of the shiftable cage 18 intermediate the disks 12 and 14. Movement of the cage 18 may be accomplished by any suitable means such as by an external screw arrangement (not shown). As the cage moves upwardly in FIGURE 1, between the axes of the offset disks 12 and 14, the rotational speed of the disk 14 is increased.

If the member 22 and its associated drive elements 28 are ignored for the moment and the collar 32 is considered as being fixed to the disk 14, it may be noted that the spring washer 36 serves to force the driven disk 14 into contact with the ball bearings 16 mounted in the cage 18. This normal (perpendicular to the faces of the disks) load provides the necessary frictional relationship between the input and the output disks 12 and 14, respectively. The spring washer 36, or any other similar resilient member that may be employed, thus produces a substantially constant normal load on the disk 14, and, if this constant load is sufficient to transmit the maximum torque that may be encountered, then it results in inefficiencies, such as wasted input power, heat, wear, etc., at the lower output torques at which the device usually operates. It is well known that, to achieve optimum efficiency and capacity, the resultant normal load between the disk 14 and the ball bearings 16 should be proportional to the torque transmitted to the output shaft 30.

Various types of variable pressure applying means, such as the jackscrew and wedge arrangement as taught by Rouverol 2,951,384, have been employed in the past. However, while such devices produce a resultant normal load which is proportional to the torque, there are inherent disadvantages in such devices, a primary one being that overload protection is not provided for.

As explained above and as may be observed in FIGURE 1, the member 22 includes a series of oppositely inclined cam surfaces or ramps 24 and 26, respectively, and a plurality of rollers or balls 28, each one of which normally remains near the base or juncture of some particular set of ramps. As the output torque increases for any reason, the collar 32 tends to lag behind or slip with respect to the member 22, while continuing to rotate in the same direction, as represented by arrows of different lengths in FIGURE 1. This causes the rolling members 28 to climb their respective ramps 24, away from the direction of rotation and toward the dotted line positions of FIGURES 1 and 2, resulting in the collar 32 and output shaft 30 being moved to the right in FIGURE 1, compressing the spring washer 36. The compression of washer 36 obviously increases the normal load between the ball bearings 16 and the adjacent faces of the disks 12 and 14 as the torque load on the shaft increases. Since the load on the disks is proportional to torque, the device 10 operates more efficiently.

Should extremely high torques, for which the device 10 was not designed, be applied to the output shaft 30, the balls 28 will climb to the top of their respective inclines 24, ride over the high points of the member 22 and roll down the adjoining declines 26. So long as the high torque continues to be applied, the drive balls 28 will continue travelling up each succeeding ramp 24, down each succeeding ramp 26 and into the next low point between ramps, resulting in an audible "ratcheting" noise which would signal the presence of an overloaded condition.

To optimize performance, the spring rate of the Belleville washer 36, or any other resilient loading device that may be employed, and the ramp angles can be selected so as to result in any desired torque output vs. spring load curve. Flexibility in design can be provided for, where the ramp member 22 is a separate piece, for example, by changing the member 22 and the washer 36, in any given device 10, to suit the particular operating requirements.

In the usual application, the housing 40 is anchored and axial movement of the shaft 30 is not desirable. To permit axial movement of the member 32, without axial movement of the shaft 30, which is usually rigidly connected to the load, the shaft 30 may be formed with a tang 48 received in a groove 50 formed in the member 32, there being sufficient clearance between the tanged end of the shaft in the grooved area of the member 32 to insert a coupling 52 made of some resilient material, such as a suitable rubber. With such a construction, the member 32 will drive the shaft 30, but at the same time permit axial movement of the member 32 to compress the spring 36 without producing axial movement in the shaft. The coupling would, of course, be designed so as to permit axial movement of the member 32 a sufficient distance to allow the members 28 to roll over the high points of the ramps.

It will be apparent from the above discussion that the invention provides means for making prior art ball and disk type transmissions more versatile and efficient and for overcoming the prior inherent disadvantages thereof. More specifically, the invention provides novel means for varying axial loading in proportion to the torque being developed, without axial movement of the output shaft, and overload protection against possible damage to the system.

While but one embodiment of the invention has been shown and described, it is apparent that other modifications of the invention are possible within the scope of the appended claims.

What I claim as my invention is:

1. A variable speed friction drive transmission, comprising an input driving means, an output driven means, a traction drive element confined between said input and said output means, said output driven means having a circular series of connected alternating oppositely-inclined surfaces formed on the end thereof opposite said traction drive element, a disk having a flat face adjacent said surfaces, a plurality of rolling traction elements confined between said surfaces and said flat face, an output shaft journalled in a stationary support, a thrust bearing and a removable preloaded resilient means disposed between said support and the adjacent side of said disk, said resilient means providing the only axial load on the elements of said transmission from said disk to said input driving means, said surfaces and their associated rolling traction elements automatically increasing said load as torque transmitted to said output driven means increases, and vice versa, said disk and said output shaft being drivingly connected by means permitting sufficient axial movement of said disk so that said rolling traction elements may move along said inclined surfaces, thereby permitting said output driven means to rotate with respect to said disk to provide overload protection for said transmission.

2. A transmission such as that recited in claim 1, wherein said circular series of inclined surfaces are formed on a separate member removably attached to said output driven means, whereby the operational characteristics of said transmission may be varied by selecting any suitable combination of inclined surface configuration and axial load.

3. A transmission such as that recited in claim 1, wherein said means connecting said output shaft to said disk is axially resilient so that movement of said disk applies no appreciable load on said output shaft.

4. A variable speed friction drive transmission, comprising an input shaft, a first input disk driven thereby, a second output disk, traction drive means confined between said input disk and said output disk, said output disk having a circular series of connected alternate oppositely-inclined surfaces on the side thereof opposite said traction means, a third disk having a flat face adjacent said surfaces, a plurality of rolling traction elements confined between said surfaces on said surfaces on said output disk and said flat face, an output shaft journalled in a stationary support, a thrust bearing and a removable preloaded resilient means disposed between said support and the adjacent side of said third disk, said resilient means being the only means for providing an axial load on the elements of said transmission from said third disk to said input disk, said surfaces and their associated rolling traction elements automatically increasing said load as torque transmitted to said output disk increases, and vice versa, said third disk and said output shaft being drivingly connected by axially resilient means permitting sufficient axial movement of said third disk so that said rolling traction elements may move along said inclined surface, thereby permitting said output disk to rotate with respect to said third disk to provide overload protection.

References Cited

UNITED STATES PATENTS

| | | | |
|---|---|---|---|
| 1,401,505 | 12/1921 | Sykora | 74—200 |
| 1,995,689 | 3/1935 | Shively | 74—200 |
| 2,163,066 | 6/1939 | Searcy | 74—200 |
| 2,607,545 | 8/1952 | McNabb | 74—200 |
| 2,675,713 | 4/1954 | Acker | 74—200 |
| 2,951,384 | 9/1960 | Rouvernol | 74—198 |

FRED C. MATTERN, JR., *Primary Examiner.*

C. J. HUSAR, *Assistant Examiner.*